United States Patent [19]

Scaringe et al.

[11] Patent Number: 5,340,790
[45] Date of Patent: Aug. 23, 1994

[54] MIXTURE OF INDOANILINE DYES IN DYE-DONOR ELEMENT FOR THERMAL DYE TRANSFER

[75] Inventors: Raymond P. Scaringe; Steven Evans, both of Rochester; William H. Simpson, Pittsford; Richard C. Vanhanehem, Rochester, all of N.Y.

[73] Assignee: Eastman Kodak Company, Rochester, N.Y.

[21] Appl. No.: 169,831

[22] Filed: Dec. 16, 1993

[51] Int. Cl.$^5$ ............ B41M 5/035; B41M 5/38
[52] U.S. Cl. .................... 503/227; 428/195; 428/480; 428/913; 428/914
[58] Field of Search ............ 8/471; 428/195, 480, 428/913, 914; 503/227

[56] References Cited

U.S. PATENT DOCUMENTS 4,695,287  9/1987  Evans et al. ............ 8/471
4,912,084  3/1990  Kanto et al. ............ 503/227

FOREIGN PATENT DOCUMENTS 60-239289  11/1985  Japan ............ 430/964

*Primary Examiner*—B. Hamilton Hess
*Attorney, Agent, or Firm*—Harold E. Cole

[57] ABSTRACT

A cyan dye-donor element for thermal dye transfer imaging comprising a support having thereon a dye layer comprising a dye dispersed in a polymeric binder, wherein the dye comprises a mixture of at least two different 2-carbamoyl-4-[N-(p-aminoaryl)-imino]-1,4-naphthoquinone dyes, each of the dyes having the formula:

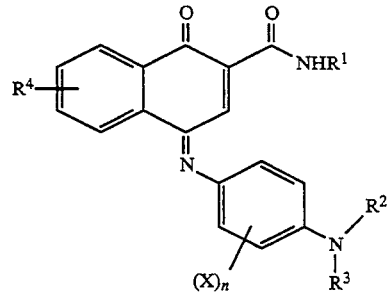

with the proviso that at least 50% of the dye mixture is a dye having the formula:

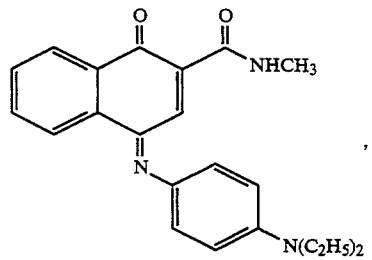

and with the further proviso that at least one of the other dyes in the mixture has the formula:

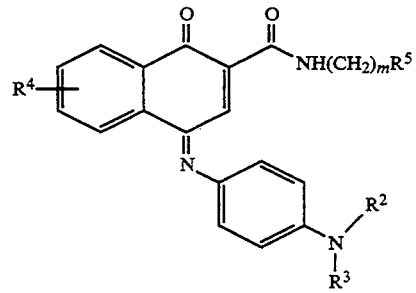

12 Claims, No Drawings

MIXTURE OF INDOANILINE DYES IN DYE-DONOR ELEMENT FOR THERMAL DYE TRANSFER

This invention relates to dye-donor elements used in thermal dye transfer, and more particularly to the use of mixtures of certain 2-carbamoyl-4-[N-(p-aminoaryl)-imino]-1,4-naphthoquinone dyes in order to reduce dye crystallization.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

JP60/239,289 and U.S. Pat. Nos. 4,695,287 and 4,912,084 disclose the use of 2-carbamoyl-4-[N-(p-aminoaryl)-imino]-1,4-naphthoquinone dyes in thermal dye-donor elements. Dye-donor elements for use in thermal dye transfer imaging must be able to withstand periods of storage under adverse conditions of heat and humidity without exhibiting changes in performance. A problem that has developed with use of the above dyes is a tendency for the dyes to crystallize upon storage. Areas of crystal growth in the dye-donor element will produce noticeable and unacceptable areas of nonuniformity upon thermal transfer of the dye to a dye-receiving element. It is an object of this invention to provide dye-donor elements employing 2-carbamoyl-4-[N-(p-aminoaryl)-imino]-1,4-naphthoquinone dyes which reduces this crystallization problem.

These and other objects are achieved in accordance with this invention which comprises a cyan dye-donor element for thermal dye transfer imaging comprising a support having thereon a dye layer comprising a dye dispersed in a polymeric binder, wherein the dye comprises a mixture of at least two different 2-carbamoyl-4-[N-(p-aminoaryl)-imino]-1,4-naphthoquinone dyes, each of the dyes having the formula:

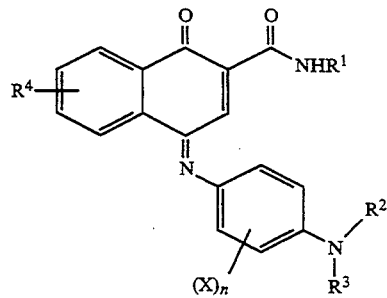

wherein
$R^1$, $R^2$ and $R^3$ each individually represents an alkyl group of from 1 to about 6 carbon atoms, a cycloalkyl group of from about 5 to about 7 carbon atoms, an aryl group of from about 5 to about 10 carbon atoms or an allyl group; or such alkyl, cycloalkyl, aryl and allyl groups substituted with one or more groups such as hydroxy, acyloxy, alkoxy, aryloxy, alkylthio, arylthio, alkylsulfonyl, arylsulfonyl, alkylsulfonamido, arylsulfonamido, thiocyano, cyano, nitro, halogen, alkoxycarbonyl, aryloxycarbonyl, acetyl, aroyl, alkylaminocarbonyl, arylaminocarbonyl, alkylaminosulfonyl, arylaminosulfonyl, alkylaminocarbonyloxy, arylaminocarbonyloxy, acylamino, amino, alkylamino, arylamino, carboxy, trihalomethyl, alkyl, aryl, hetaryl, alkylureido, arylureido, succinimido, phthalimido and the like; such as methyl, ethyl, propyl, isopropyl, butyl, pentyl, hexyl, methoxyethyl, benzyl, 2-methanesulfonamido-ethyl, 2-hydroxyethyl, 2-cyanoethyl, methoxycarbonylmethyl, cyclohexyl, cyclopentyl, phenyl, pyridyl, naphthyl, p-tolyl, p-chlorophenyl, m-(N-methylsulfamoyl)phenyl, etc.;

$R^2$ and $R^3$ may be combined together to form a 5- or 6-membered ring such as morpholine, pyrrolidine or piperidine;

$R^2$ and/or $R^3$ may be combined with one or two of X to form a 5- or 6-membered ring such as tetrahydroquinoline or julolidine;

$R^4$ and X each individually represents hydrogen; a substituted or unsubstituted alkyl group of from about 1 to about 6 carbon atoms, such as those described above for $R^1$, $R^2$, and $R^3$; halogen, such as chlorine, bromine, or fluorine; —NHCOR$^1$ or —NHSO$_2$R$^1$; and n represents an integer from 1 to 4;

with the proviso that at least 50% of the dye mixture is a dye having the formula:

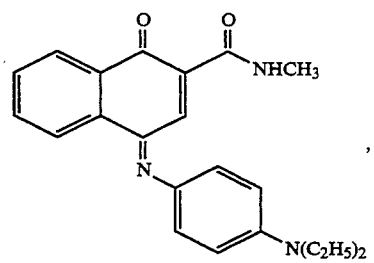

and with the further proviso that at least one of the other dyes in the mixture has the formula:

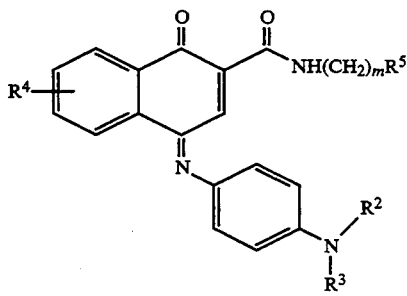

wherein $R^5$ represents a branched-chain alkyl group of from 1 to about 6 carbon atoms, a cycloalkyl group of from about 5 to about 7 carbon atoms, an aryl group of from about 5 to about 10 carbon atoms, alkoxycarbonyl, aryloxycarbonyl, acetyl, aroyl, alkylaminocarbonyl, arylaminocarbonyl, alkylaminocarbonyloxy, arylaminocarbonyloxy, acylamino, aryloxy, acylamino, acyloxy or arylsulfonamido; or such alkyl, cycloalkyl and aryl groups substituted with one or more groups such as those listed above for $R^1$, $R^2$, and $R^3$;

$R^2$, $R^3$ and $R^4$ are defined as above; and m represents an integer from 1 to 4.

It has been unexpectedly found that use of the above dye mixture in a cyan dye-donor element alleviates dye storage and crystallization problems, thereby providing significantly improved cyan dye stability and superior thermal transfer images.

In a preferred embodiment of the invention, the dye which comes within the proviso of the formula above has an $R^1$ which is either isobutyl or benzyl. In another preferred embodiment of the invention, the dye which comes within the proviso of the formula above has an $R^2$ or $R^3$ which is either isopropyl or ethyl.

Dyes included within the scope of the invention are disclosed in JP60/239,289 and U.S. Pat. Nos. 4,695,287 and 4,912,084, referred to above, the disclosures of which are hereby incorporated by reference. Specific dyes useful in the invention include the following:

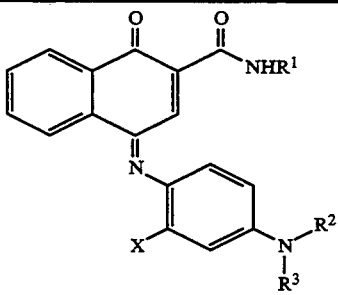

| DYE | $R^1$ | X | $R^2$ | $R^3$ |
|---|---|---|---|---|
| 1* | i-$C_4H_9$ | H | $C_2H_5$ | $C_2H_5$ |
| 2* | $CH_2(C_6H_5)$ | H | $C_2H_5$ | $C_2H_5$ |
| 3* | $CH_2CH_2(C_6H_5)$ | H | $C_2H_5$ | $C_2H_5$ |
| 4* | $CH_2(C_6H_5)$ | H | i-$C_3H_7$ | $C_2H_5$ |
| 5* | $CH_2CH_2$-(p)-($C_6H_4$)—NHCOCH$_3$ | H | $C_2H_5$ | $C_2H_5$ |
| 6* | $CH_2NHCOCH_3$ | H | $C_2H_5$ | $C_2H_5$ |
| 7* | $CH_2NHCO_2C_2H_5$ | H | $C_2H_5$ | $C_2H_5$ |
| 8* | $CH_2$-(p)-($C_6H_4$)$CO_2C_2H_5$ | H | $C_2H_5$ | $C_2H_5$ |
| 9* | $CH_2CH_2$-(o)-($C_6H_4$)—NHCOC$_2$H$_5$ | H | $C_2H_5$ | $C_2H_5$ |
| 10* | $C(CH_3)_2CH_2(C_6H_5)$ | H | $C_2H_5$ | $C_2H_5$ |

-continued

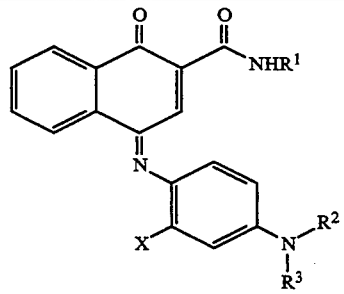

| DYE | $R^1$ | X | $R^2$ | $R^3$ |
|---|---|---|---|---|
| 11* | $CH_2CH_2$-(p)-($C_6H_4$)NHSO$_2$-(p)-($C_6H_4$)—CH$_3$ | H | $C_2H_5$ | $C_2H_5$ |
| A | $CH_3$ | H | $C_2H_5$ | $C_2H_5$ |
| B | $CH_3$ | $CH_3$ | $C_2H_5$ | $C_2H_5$ |
| C | $C_2H_5$ | H | $C_2H_5$ | $C_2H_5$ |
| D | i-$C_3H_7$ | H | $C_2H_5$ | $C_2H_5$ |
| E | $CH_3$ | H | i-$C_3H_7$ | $C_2H_5$ |
| F | $CH_3$ | H | i-$C_4H_9$ | $C_2H_5$ |

*These dyes come within the proviso in the formula

A dye-barrier layer may be employed in the dye-donor elements of the invention to improve the density of the transferred dye. Such dye-barrier layer materials include hydrophilic materials such as those described and claimed in U.S. Pat. No. 4,716,144.

The dyes in the dye-donor element of the invention are dispersed in a polymeric binder such as a cellulose derivatives, e.g., cellulose acetate hydrogen phthalate, cellulose acetate, cellulose acetate propionate, cellulose acetate butyrate, cellulose triacetate or any of the materials described in U.S. Pat. No. 4,700,207; a polycarbonate; poly(styrene-co-acrylonitrile), a polysulfone or a poly(phenylene oxide). The binder may be used at a coverage of from about 0.1 to about 5 g/m$^2$.

The dye layer of the dye-donor element may be coated on the support or printed thereon by a printing technique such as a gravure process.

Any material can be used as the support for the dye-donor element of the invention provided it is dimensionally stable and can withstand the heat of the thermal printing heads. Such materials include polyesters such as poly(ethylene terephthalate); polyamides; polycarbonates; glassine paper; condenser paper; cellulose esters such as cellulose acetate; fluorine polymers such as poly(vinylidene fluoride) or poly(tetrafluoroethylene-co-hexafluoropropylene); polyethers such as polyoxymethylene; polyacetals; polyolefins such as polystyrene, polyethylene, polypropylene or methylpentene polymers; and polyimides such as polyimide-amides and polyether-imides. The support generally has a thickness of from about 2 to about 30 μm. It may also be coated with a subbing layer, if desired, such as those materials described in U.S. Pat. Nos. 4,695,288 and 4,737,486.

The reverse side of the dye-donor element may be coated with a slipping layer to prevent the printing head from sticking to the dye-donor element. Such a slipping layer would comprise a lubricating material such as a surface-active agent, a liquid lubricant, a solid lubricant or mixtures thereof, with or without a polymeric binder. Preferred lubricating materials include oils or semicrystalline organic solids that melt below 100° C. such as poly(vinyl stearate), beeswax, perfluorinated alkyl ester polyethers, polycaprolactone, silicone oil, poly(tetrafluoroethylene), carbowax, poly(ethylene glycols), or any of those materials disclosed in U.S. Pat.

Nos. 4,717,711, 4,717,712, 4,737,485, 4,738,950, and 4,829,050. Suitable polymeric binders for the slipping layer include poly(vinyl alcohol-co-butyral), poly(vinyl alcohol-co-acetal), polystyrene, poly(vinyl acetate), cellulose acetate butyrate, cellulose acetate propionate, cellulose acetate or ethyl cellulose.

The amount of the lubricating material to be used in the slipping layer depends largely on the type of lubricating material, but is generally in the range of about 0.001 to about 2 $g/m^2$. If a polymeric binder is employed, the lubricating material is present in the range of 0.001 to 50 weight %, preferably 0.5 to 40, of the polymeric binder employed.

The dye-receiving element that is used with the dye-donor element of the invention usually comprises a support having thereon a dye image-receiving layer. The support may be a transparent film such as a poly(ether sulfone), a polyimide, a cellulose ester such as cellulose acetate, a poly(vinyl alcohol-co-acetal) or a poly(ethylene terephthalate). The support for the dye-receiving element may also be reflective such as baryta-coated paper, polyethylene-coated paper, white polyester (polyester with white pigment incorporated therein), an ivory paper, a condenser paper or a synthetic paper such as DuPont Tyvek®.

The dye image-receiving layer may comprise, for example, a polycarbonate, a polyurethane, a polyester, poly(vinyl chloride), poly(styrene-co-acrylonitrile), polycaprolactone or mixtures thereof. The dye image-receiving layer may be present in any amount which is effective for the intended purpose. In general, good results have been obtained at a concentration of from about 1 to about 5 $g/m^2$.

As noted above, the dye-donor elements of the invention are used to form a dye transfer image. Such a process comprises imagewise-heating a dye-donor element as described above and transferring a dye image to a dye-receiving element to form the dye transfer image.

The dye-donor element of the invention may be used in sheet form or in a continuous roll or ribbon. If a continuous roll or ribbon is employed, it may have only the dye thereon as described above or may have alternating areas of other different dyes, such as sublimable cyan and/or magenta and/or yellow and/or black or other dyes. Such dyes are disclosed in U.S. Pat. Nos. 4,541,830, 4,698,651, 4,695,287, 4,701,439, 4,757,046, 4,743,582, 4,769,360, and 4,753,922; the disclosures of which are hereby incorporated by reference. Thus, one-, two-, three- or four-color elements (or higher numbers also) are included within the scope of the invention.

In a preferred embodiment of the invention, the dye-donor element comprises a poly(ethylene terephthalate) support coated with sequential repeating areas of yellow, magenta and the cyan dyes as described above, and the above process steps are sequentially performed for each color to obtain a three-color dye transfer image. Of course, when the process is only performed for a single color, then a monochrome dye transfer image is obtained.

Thermal printing heads which can be used to transfer dye from the dye-donor elements of the invention are available commercially. There can be employed, for example, a Fujitsu Thermal Head (FTP-A040MCS001), a TDK Thermal Head F415 HH7-1089 or a Rohm Thermal Head KE 2008-F3.

A thermal dye transfer assemblage of the invention comprises:

(a) a dye-donor element as described above, and
(b) a dye-receiving element as described above, the dye-receiving element being in a superposed relationship with the dye-donor element so that the dye layer of the donor element is in contact with the dye image-receiving layer of the receiving element.

The above assemblage comprising these two elements may be preassembled as an integral unit when a monochrome image is to be obtained. This may be done by temporarily adhering the two elements together at their margins. After transfer, the dye-receiving element is then peeled apart to reveal the dye transfer image.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The following example is provided to illustrate the invention.

EXAMPLE

Cyan dye-donor elements were prepared by coating the following layers in the order recited on a 6 $\mu$m poly(ethylene terephthalate) support:

1) subbing layer of DuPont Tyzor TBT® titanium tetra-n-butoxide (0.16 $g/m^2$) coated from n-butyl alcohol, and 2) dye layer containing the mixture of cyan dyes identified below and illustrated above (0.48 $g/m^2$, total dye laydown, except for Element V which was 0.49 $g/m^2$, Element VI which was 0.51 $g/m^2$, and Elements Control-5, VII and VIII which were 0.55 $g/m^2$,) and Fluorad FC-430® fluorocarbon surfactant (3M Company) (0.002 $g/m^2$), a micronized blend of polyethylene, polypropylene and oxidized polyethylene particles (Shamrock Technologies S363-N1) (0.02 $g/m^2$)(all elements except Control-5, VII and VIII) in a cellulose acetate propionate binder (2.5% acetyl, 45% propionyl) (0.34 $g/m^2$) coated from a mixture of toluene, methanol and cyclopentanone (66:29:5).

On the back side of the donor was coated a subbing layer 1) as above, and a slipping layer of Montan wax (Ross Corp.) (0.03 $g/m^2$), PS-513 amino-terminated poly(dimethylsiloxane) (Petrarch Systems Inc.) (0.01 $g/m^2$) and para-toluenesulfonic acid (0.0003 $g/m^2$) in a cellulose acetate propionate binder (2.5% acetyl, 45% propionyl) (0.54 $g/m^2$) coated from a mixture of toluene, methanol and cyclopentanone (66:29:5).

The incubation stability of the dye-donors prepared above was tested using the following procedure: approximately ten meters of each of the above dye-donor elements were wound tightly around 2 cm. diameter plastic spools with the dye layers facing inwards. These donor rolls were then placed in foil-lined plastic bags. The bags were then sealed and heated for 3 days at 60° C. After removal from the bags, representative areas of the dye-donor elements were evaluated for crystal growth by examination under a microscope at a magnification of 155× or 390× and photomicrographs were made.

The severity of crystal growth was ranked from 0 to 5, with 0 representing no evidence of crystals, 3 representing a significant number of crystals, and 5 representing essentially complete crystallization of the dye in the dye-donor element.

Similarly, crystal size was ranked from 1 to 5, with 1 representing very small crystals, 3 representing medium size crystals, and 5 representing very large crystals. The results obtained are shown in the following table:

TABLE

| Dye-Donor Element | Dye 1 | Dye 2 | Dye 3 | Ratio (1:2:3) | Severity of dye Crystals | Size of Dye Crystals |
|---|---|---|---|---|---|---|
| I | A | 1* | — | 93:7 | 3 | 3 |
| II | A | 1* | — | 80:20 | 3 | 2 |
| III | A | B | 1* | 75:22:3 | 1 | 2 |
| IV | A | B | 1* | 71:22:7 | 1 | 2 |
| V | A | B | 2* | 76:22:2 | 1 | 2 |
| VI | A | B | 2* | 71:22:7 | 1 | 2 |
| VII | A | B | 1* | 68:20:12 | 1 | 1 |
| VIII | A | B | 2* | 68:20:12 | 1 | 1 |
| Control I | A | — | — | 100:0 | 4 | 5 |
| Control II | A | E | — | 93:7 | 4 | 5 |
| Control III | A | E | — | 80:20 | 3 | 4 |
| Control IV | A | B | — | 78:22 | 4 | 5 |
| Control V | A | B | E | 68:20:12 | 4 | 5 |

*These dyes come within the proviso in the formula

The above results show that greatly improved resistance to crystal growth and crystal size in dye-donor elements for thermal dye transfer imaging is provided by the use of mixtures of as specified by the invention.

The invention has been described in detail with particular reference to preferred embodiments thereof, but it will be understood that variations and modifications can be effected within the spirit and scope of the invention.

We claim:

1. A cyan dye-donor element for thermal dye transfer imaging comprising a support having thereon a dye layer comprising a dye dispersed in a polymeric binder, wherein said dye comprises a mixture of at least two different 2-carbamoyl-4-[N-(p-aminoaryl)imino]-1,4-naphthoquinone dyes, each of said dyes having the formula:

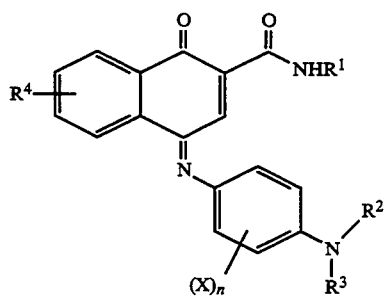

wherein $R^1$, $R^2$ and $R^3$ each individually represents a substituted or unsubstituted alkyl group of from 1 to about 6 carbon atoms, a substituted or unsubstituted cycloalkyl group of from about 5 to about 7 carbon atoms, a substituted or unsubstituted aryl group of from about 6 to about 10 carbon atoms or an allyl group;

$R^2$ and $R^3$ may be combined together to form a 5- or 6-membered ring;

$R^2$ and/or $R^3$ may be combined with one or two of X to form a 5- or 6-membered ring;

$R^4$ and X each individually represents hydrogen; a substituted or unsubstituted alkyl group of from about 1 to about 6 carbon atoms; halogen; —NHCOR$^1$ or —NHSO$_2$R$^1$; and n represents an integer from 1 to 4;

with the proviso that at least 50% of said dye mixture is a dye having the formula:

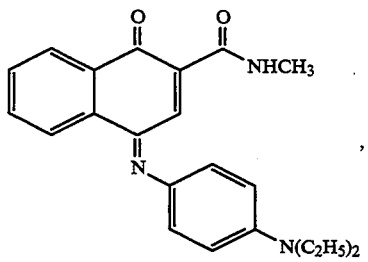

and with the further proviso that at least one of said other dyes in the mixture has the formula:

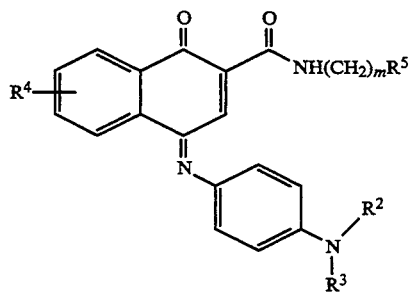

wherein $R^5$ represents a substituted or unsubstituted branched-chain alkyl group of from 1 to about 6 carbon atoms, a substituted or unsubstituted cycloalkyl group of from about 5 to about 7 carbon atoms, a substituted or unsubstituted aryl group of from about 6 to about 10 carbon atoms, alkoxycarbonyl, aryloxycarbonyl, acetyl, aroyl, alkylaminocarbonyl, arylaminocarbonyl, alkylaminocarbonyloxy, arylaminocarbonyloxy, acylamino, aryloxy, acylamino, acyloxy or arylsulfonamido;

$R^2$, $R^3$ and $R^4$ are defined as above; and m represents an integer from 1 to 4.

2. The element of claim 1 wherein $R^1$ is either isobutyl or benzyl.

3. The element of claim 1 wherein $R^2$ or $R^3$ is either isopropyl or ethyl.

4. The element of claim 1 wherein said support comprises poly(ethylene terephthalate) and the side of the support opposite the side having thereon said dye layer is coated with a slipping layer comprising a lubricating material.

5. The element of claim 1 wherein said dye layer comprises repeating areas of yellow, magenta and said cyan dyes.

6. A process of forming a dye transfer image comprising imagewise-heating a cyan dye-donor element comprising a support having thereon a dye layer comprising a dye dispersed in a polymeric binder and transferring a dye image to a dye-receiving element to form said dye transfer image, wherein said dye comprises a mixture of at least two different 2-carbamoyl-4-[N-(p-aminoaryl)-imino]-1,4-naphthoquinone dyes, each of said dyes having the formula:

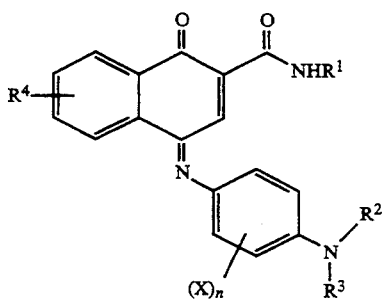

wherein $R^1$, $R^2$ and $R^3$ each individually represents a substituted or unsubstituted alkyl group of from 1 to about 6 carbon atoms, a substituted or unsubstituted cycloalkyl group of from about 5 to about 7 carbon atoms, a substituted or unsubstituted aryl group of from about 6 to about 10 carbon atoms or an allyl group;

$R^2$ and $R^3$ may be combined together to form a 5- or 6-membered ring;

$R^2$ and/or $R^3$ may be combined with one or two of X to form a 5- or 6-membered ring;

$R^4$ and X each individually represents hydrogen; a substituted or unsubstituted alkyl group of from about 1 to about 6 carbon atoms; halogen; —NHCOR$^1$ or —NHSO$_2$R$^1$; and n represents an integer from 1 to 4;

with the proviso that at least 50% of said dye mixture is a dye having the formula:

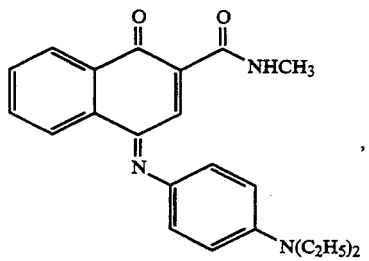

and with the further proviso that at least one of said other dyes in the mixture has the formula:

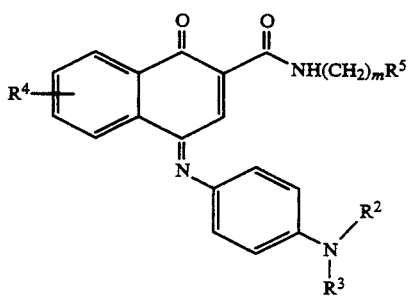

wherein

AR$^5$ represents a substituted or unsubstituted branched-chain alkyl group of from 1 to about 6 carbon atoms, a substituted or unsubstituted cycloalkyl group of from about 5 to about 7 carbon atoms, a substituted or unsubstituted aryl group of from about 6 to about 10 carbon atoms, alkoxycarbonyl, aryloxycarbonyl, acetyl, aroyl, alkylaminocarbonyl, arylaminocarbonyl, alkylaminocarbonyloxy, arylaminocarbonyloxy, acylamino, aryloxy, acylamino, acyloxy or arylsulfonamido;

$R^2$, $R^3$ and $R^4$ are defined as above; and m represents an integer from 1 to 4.

7. The process of claim 6 wherein $R^1$ is either isobutyl or benzyl.

8. The process of claim 6 wherein $R^2$ or $R^3$ is either isopropyl or ethyl.

9. The process of claim 6 wherein said support is poly(ethylene terephthalate) which is coated with sequential repeating areas of yellow, magenta and said cyan dyes, and said process steps are sequentially performed for each color to obtain a three-color dye transfer image.

10. A thermal dye transfer assemblage comprising:
(a) a cyan dye-donor element comprising a support having thereon a dye layer comprising a dye dispersed in a polymeric binder, and
(b) a dye-receiving element comprising a support having thereon a dye image-receiving layer, said dye-receiving element being in superposed relationship with said dye-donor element so that said dye layer is in contact with said dye image-receiving layer, wherein said dye comprises a mixture of at least two different 2-carbamoyl-4-[N-(p-aminoaryl)-imino]-1,4-naphthoquinone dyes, each of said dyes having the formula:

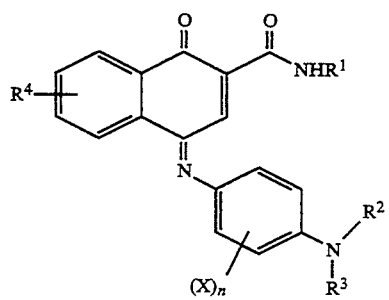

wherein $R^1$, $R^2$ and $R^3$ each individually represents a substituted or unsubstituted alkyl group of from 1 to about 6 carbon atoms, a substituted or unsubstituted cycloalkyl group of from about 5 to about 7 carbon atoms, a substituted or unsubstituted aryl group of from about 6 to about 10 carbon atoms or an allyl group;

$R^2$ and $R^3$ may be combined together to form a 5- or 6-membered ring;

$R^2$ and/or $R^3$ may be combined with one or two of X to form a 5- or 6-membered ring;

$R^4$ and X each individually represents hydrogen; a substituted or unsubstituted alkyl group of from about 1 to about 6 carbon atoms; halogen; —NHCOR$^1$ or —NHSO$_2$R$^1$; and n represents an integer from 1 to 4;

with the proviso that at least 50% of said dye mixture is a dye having the formula:

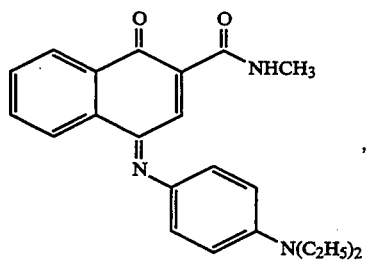

and with the further proviso that at least one of said other dyes in the mixture has the formula:

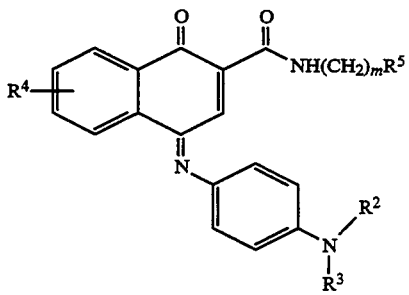

wherein

R[5] represents a substituted or unsubstituted branched-chain alkyl group of from 1 to about 6 carbon atoms, a substituted or unsubstituted cycloalkyl group of from about 5 to about 7 carbon atoms, a substituted or unsubstituted aryl group of from about 6 to about 10 carbon atoms, alkoxycarbonyl, aryloxycarbonyl, acetyl, aroyl, alkylaminocarbonyl, arylaminocarbonyl, alkylaminocarbonyloxy, arylaminocarbonyloxy, acylamino, aryloxy, acylamino, acyloxy or arylsulfonamido;

R[2], R[3] and R[4] are defined as above; and m represents an integer from 1 to 4.

11. The assemblage of claim 10 wherein R[1] is either isobutyl or benzyl.

12. The assemblage of claim 10 wherein R[2] or R[3] is either isopropyl or ethyl.

* * * * *